March 8, 1938.  A. F. PIEPER  2,110,339
FLUID CONTROL DEVICE
Filed June 23, 1934   2 Sheets-Sheet 2
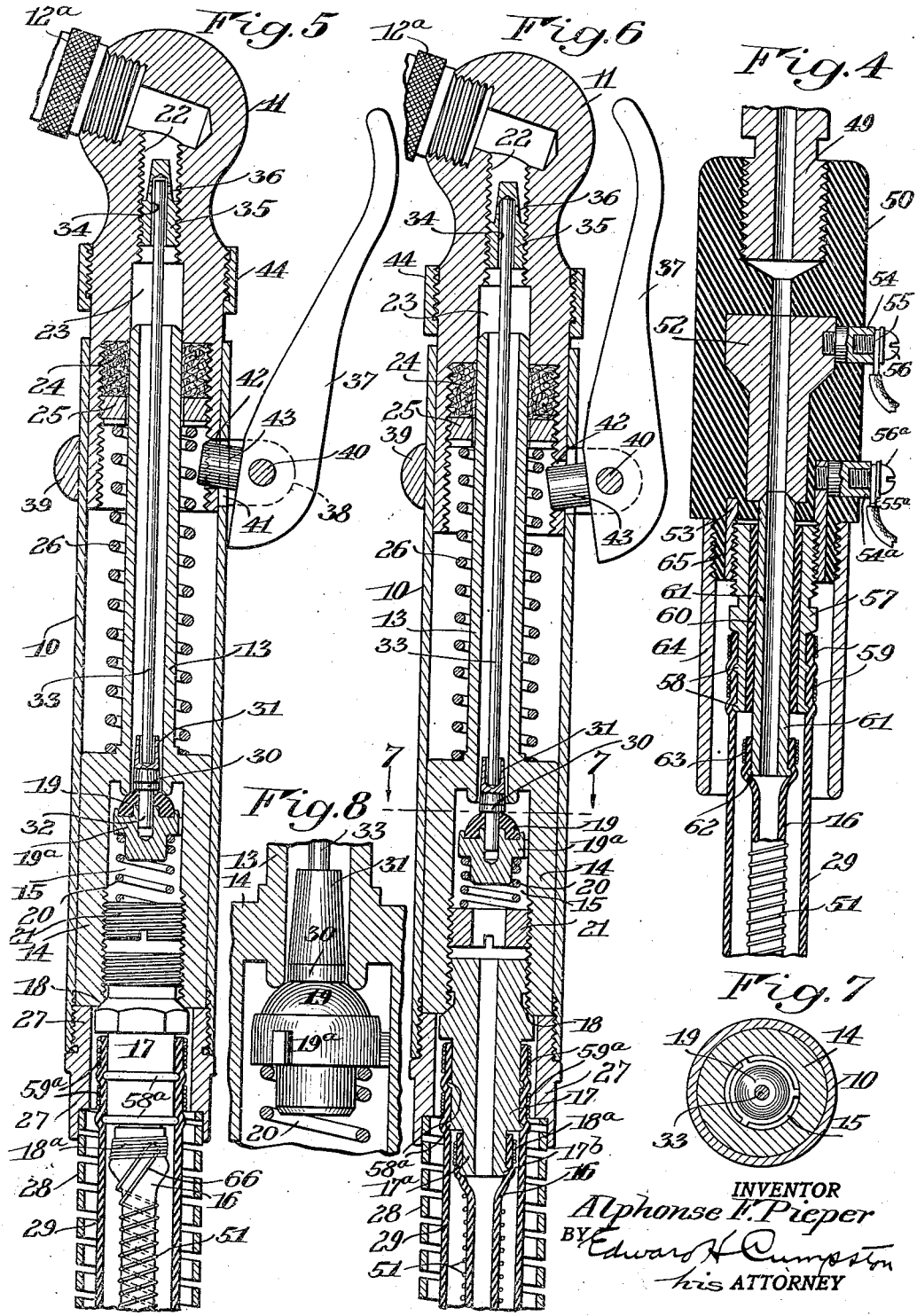
INVENTOR
Alphonse F. Pieper
BY Edward H. Cumpston
his ATTORNEY Patented Mar. 8, 1938

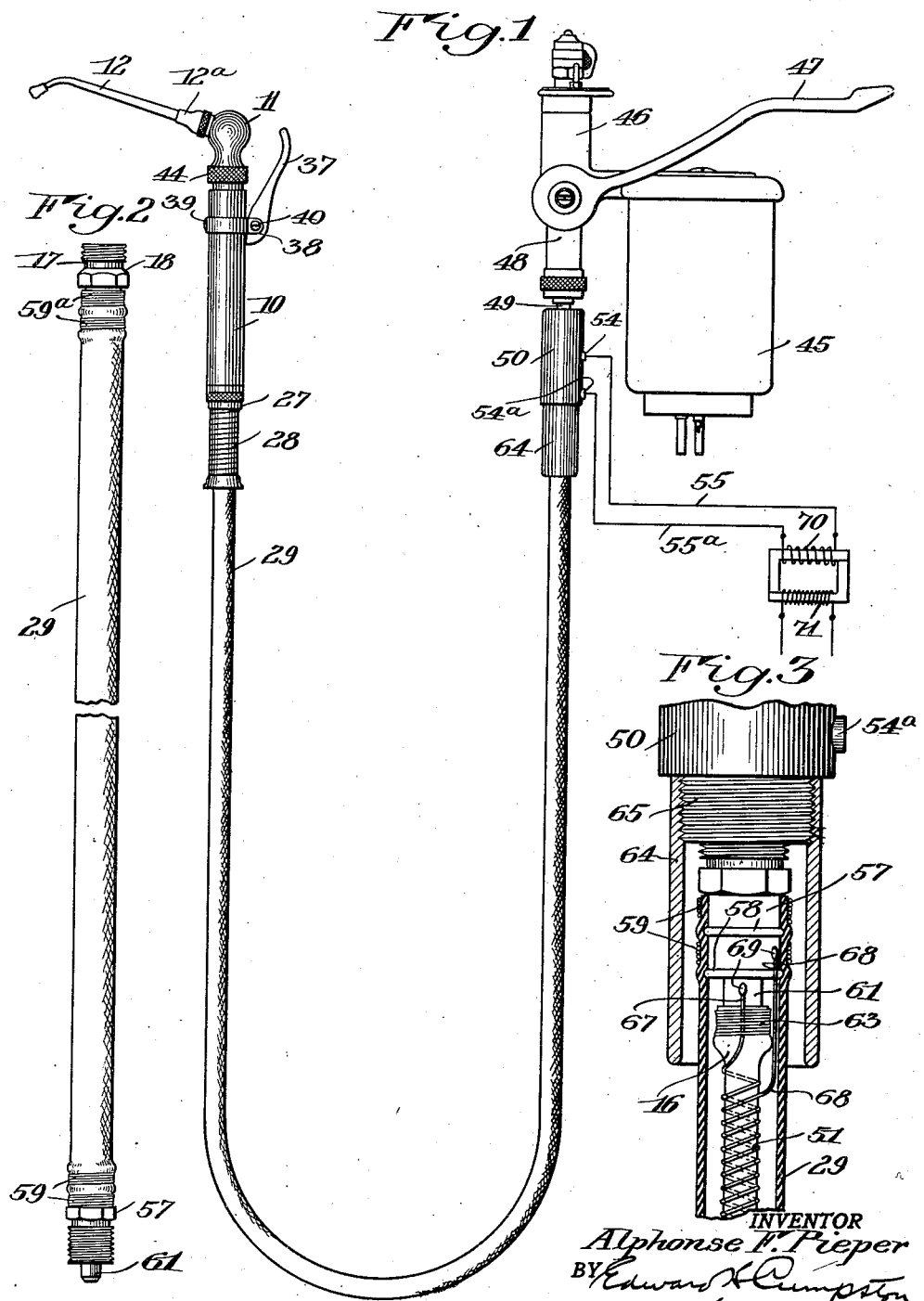

2,110,339

UNITED STATES PATENT OFFICE 2,110,339

FLUID CONTROL DEVICE

Alphonse F. Pieper, Rochester, N. Y.

Application June 23, 1934, Serial No. 732,127

8 Claims. (Cl. 128—400)

The present invention relates to a fluid control device such, for example, as one of the dental syringe type, and has for its object generally to provide in a device of this character improved means for controlling the flow and temperature of the fluid or liquid, comprising an efficient and economical form of construction which can be conveniently handled and controlled in operation.

A further object of the invention is to provide an improved tube or conduit for connection with a liquid or fluid supply source under pressure, including means adapted to heat and maintain the fluid or liquid therein at the desired temperature.

A further object of the invention is to provide a unitary fluid heating tube or conduit adapted for attachment to a fluid supply source and for the reception of a syringe or other control device and one having improved electrically heated means for heating or maintaining the fluid or liquid therein at the desired temperature, and in which the heating means is sealed within the unit in a manner to prevent its coming in contact with the liquid or air, to which it would otherwise be exposed.

A further object of the invention is to provide in a device of the class described improved means for controlling or regulating the flow of the fluid or liquid whereby to provide for a gradual increase in the volume of the stream discharging therefrom during initial operation of the device, in order to insure a smooth and even flow of the liquid as distinguished from the usual rapid expulsion of the same under pressure.

A further object of the invention is to provide improvements in a combined dental syringe and fluid holding tube or conduit which will afford new and improved results in the control of the flow and regulation of the temperature of the fluid in devices of this character.

A further object of the invention is to provide in combination with a fluid or liquid heating device, an improved dental syringe connected with the heating device by means of flexible tubing having an enclosed heating element such as an electrically heated coil unexposed to the fluid and sealed within the tubing against exposure to outside air and moisture whereby to protect the heating element against the effects of oxidation or corrosion and whereby to heat or maintain the fluid or liquid remaining in the tube from time to time at a temperature corresponding substantially to that of the fluid within the heater, so that upon opening the nozzle control valve the initial supply of liquid discharging from the latter will be of the desired temperature and ready for immediate use.

To these and other ends the invention resides in certain improvements and combinations of parts, all as will be hereinafter more fully described, the novel features being pointed out in the claims at the end of the specification.

In the drawings:

Fig. 1 is an elevation of a fluid temperature control device embodying the invention;

Fig. 2 is a view of the tubing unit detached from the heater and the syringe with which it is shown connected in Fig. 1;

Fig. 3 is a fragmentary sectional elevation of a portion of the double resistance coil showing the manner of connecting its ends with the metal parts for attaching the tubing to the hot water heater;

Fig. 4 is a longitudinal section showing the manner of connecting the tubing with the insulating support therefor and the circuit receiving terminals carried thereby;

Fig. 5 is a longitudinal section through the syringe with the outlet valve shown in closed position;

Fig. 6 is a similar view showing the valve in open position;

Fig. 7 is a transverse section taken on line 7—7 of Fig. 6, and

Fig. 8 is a longitudinal section through the valve drawn to an enlarged scale.

The same reference numerals throughout the several views indicate the same parts.

The present syringe is one of the type adapted for connection with a liquid or fluid supply source under pressure and in which the injection of the liquid is effected by the pressure in the system, such, for example, as a water supply system. The syringe may be connected with either a warm or cold water supply source, as preferred. While the present device is intended for use primarily by members of the dental profession in whatever capacity it may be found advantageous in the treatment of the teeth of the patients, it is not necessarily limited to such usage and may be employed by others for the injection of fluids or liquids for whatever purpose desired.

Referring to the drawings, the syringe proper comprises a pair of inner and outer tubular members 10 and 11, respectively, telescoped for longitudinal movement one relative to the other, and 12 represents a nozzle tube connected with the outer tubular member 11, by a coupling 12a as shown in Fig. 1. The tubular member 11 preferably comprises a recessed head for supporting the nozzle, the head being slidably mounted in the outer end of the member 10, comprising in the present instance a sleeve or tubular casing preferably having the function of a handle. A tube 13 is disposed within the casing and has an enlarged end 14 fitting the bore thereof. The enlarged end 14 is provided with a valve chamber 15 to which liquid or fluid is supplied under pressure by a conduit 16 connected with the valve chamber by a coupling 17. The coupling is preferably screwed into the portion 14 and is provided with a tapered seat 18 tightly fitting a correspondingly tapered seat on the end of said portion 14 whereby a liquid tight joint is formed between said parts. A valve 19 having a holder 19a is disposed within the chamber 15 and normally closes the inner end of the tube 13, as shown in Fig. 5. The valve is held upon its seat by a spring 20, the inner end of which is preferably supported by a member 21 threaded within the tubular portion 14 for adjustment longitudinally therein to vary the tension on the spring, whereby to regulate the pressure required to open the valve.

The head 11 is provided with an outlet 22 leading to the nozzle, the outlet being in communication with a bore 23 in which is telescoped the outer end of the tube 13, which in all positions of the head projects within the bore thereof.

The head is recessed to receive suitable packing 24 surrounding the tube 13 as shown in Fig. 5 whereby to form a liquid tight joint between the head and tube. A support 25 is threaded within the head for longitudinal movement therein to compress the packing and may be adjusted for this purpose from time to time by the use of a suitable tool such as a spanner wrench. A spring 26 is interposed between the support 25 and the inner end 14 of the tube 13 to urge the head 11 outwardly to the normal position shown in Fig. 5.

A thimble 27 is threaded within and forms a support for the tubular casing 10 and also serves as a support for the tube 13 within the casing. Suitably connected with the thimble is a coiled spring 28 forming a guard for the outer hose or conduit 29 adjacent its point of connection with the syringe, the purpose of said conduit being described hereinafter.

The valve 19 may be formed of any suitable material such as rubber and has a recessed extension thereon comprising a cylindrical portion 30 terminating in a tapered or conical end portion 31, each of said portions normally lying within the recess or bore of the tube 13, the valve extension having a depending part 32 projecting through the valve proper within a recess formed in the support 19a, as shown in Fig. 5. Loosely positioned within the tapered portion 31 of the valve extension is an operating stem or element 33 which extends within the tube 13 and preferably projects into the discharge passage 22 of the outer tubular member 11. The upper end of the valve stem extends loosely within the bore 34 of an actuating member 35 for the stem which is made adjustable within the passage 22 by threading it therein, the diameter of the bore being slightly larger than that of the stem to permit the fluid or liquid to pass around the stem and through the lateral ports 36 for discharging liquid to the nozzle 12 when the valve 19 is in open position as shown in Fig. 6.

As previously stated, it is desired to control or regulate the flow of the liquid to the nozzle in order to provide for a gradual increase in the volume of the stream discharging from the same during initial operation of the syringe whereby to insure a smooth and even flow of the liquid or, in other words, to prevent a too rapid discharge thereof upon the initial opening of the valve. This is accomplished by making the cylindrical portion 30 of the valve extension but slightly smaller in diameter than the diameter of the bore of the tubular member 13 so as to provide for a restricted flow of the liquid upon the initial downward movement of the valve stem 33. However upon continued downward movement of the stem and valve the tapered portion 31 of the extension will permit of a gradual increase in the size of the inlet opening of the tube 13 thus affording a gradual increase in the flow of the liquid through the tube.

The valve stem actuating member 35, as previously stated, is made adjustable longitudinally within the outer tubular member 11 and its normal position will be such as to slightly clear the outer end of the stem in order to insure proper seating of the valve 19 under pressure of the spring 20.

However, the actuating member 35 is designed to afford selective control of the valve whereby it may be set at a slightly open position if desired to permit of a drop by drop discharge of the liquid or, if preferred, it may be adjusted to permit of a continuous discharge of a steady stream of varying capacity merely by turning the actuating member within the threaded passage 22 of the head by the use of a suitable tool inserted through the bore 23 of the head before the latter is assembled within the casing 10.

The operating means for moving the nozzle head inwardly against the resistance of the spring 26 to effect opening of the valve 19 comprises a finger lever 37 having its lower end disposed between the ends 38 of a band 39 which is preferably clamped upon the tubular casing 10 by a bolt or pin 40 forming a pivot upon which the lever is adapted to swing. At the point of connection of the band with the casing 10 an opening 41 is cut in one side of the casing which is in registry with another opening 42 formed in the wall of the nozzle head 11. The finger lever 37 carries a lateral projection 43 extending through the opening 41 into and preferably through an opening 42 of the tubular head 11, so that upon moving the lever to the position shown in Fig. 6 the head will be moved within the casing 10 and relative to the tube 13, the inward movement of the head being limited by the contacting of an adjustable stop collar 44 on the head with the outer end of the casing 10 which may occupy different positions according to the extent to which it is desired to open the valve.

The supply means from which the fluid or liquid is discharged to the flexible tubing and the syringe may be of any well known type such, for example, as that shown by United States Patent No. 1,911,386, comprising a liquid control unit for supplying either hot or cold water to a dental syringe. A corresponding unit is indicated generally at 45 in Fig. 1 and comprises a reservoir having liquid inlet connections, not shown, and a communicating valve housing 46 having a discharge valve provided with an operating arm 47, forked at its end to receive and support the syringe and adapted to be actuated thereby to control said valve, not shown.

The housing has an extension 48 provided with a threaded end portion 49 upon which is screwed the insulating coupling 50 for supporting the flexible tubing, the heating coil therein and other parts, as shown in Fig. 4. The tubing comprises the inner and outer tubular members 16 and 29, the resistance element 51 for heating the fluid being secured on the outer surface of the inner tube which contains the fluid to be heated or kept at the desired temperature, when not using the syringe. The resistance element may be formed in any desired manner but preferably comprises a double coil of wire wound on the inner tube in a manner described hereinafter and so positioned as not to come in contact with the fluid or liquid flowing through or contained within the tubing.

The coil is also protected from exposure to outside air and moisture during the changes in temperature of the heating and cooling periods for the liquid within the supply reservoir 45, since the interior of the outer tube 29 is kept in air tight condition at all times, as described hereinafter. If the resistance element or coil 51 were exposed there would be periodic accumulations of moisture on the surface of the coil between the heating and cooling periods, due to condensation, which would be likely to result in oxidation or corrosion of the metal and gradual deterioration of the same.

The coupling 50 which is formed of suitable insulating material, as, for example, phenol condensation products, such as "Bakelite", has secured thereon a terminal receiving part 52 insulated from a second terminal receiving part 53, both of said parts being secured by molding the material of the coupling about the same as shown in Fig. 4. Detachably connected with the parts 52 and 53 are the posts or studs 54 and 54a with which the terminals of the wires 55 and 55a are connected by the screws 56.

A nipple 57 serves to connect the outer flexible tube 29 with the terminal contact member 53 into which the threaded end of the nipple is screwed as shown in Fig. 4. The nipple is provided with annular rib-like portions 58 over which the end of the tube 29 is forced whereby to more firmly secure the tube upon the nipple. To insure a better gripping action between the nipple and tube, the latter is held by tightly wrapping thereon relatively fine wire or strong thread-like material, as indicated at 59 in Fig. 4, the two wrappings shown being at opposite sides of one of the annular shoulder portions of the tube forced outwardly by the underlying rib-like portions of the nipple, whereby a strong leak-proof joint between the tube and the nipple is afforded, so that no air or liquid can possibly enter the tube around the nipple and cause damage to the resistance coil, wound on the inner tube.

The opposite end of the tube 29 is likewise secured upon the nipple 17, the latter having the annular rib-like portions 58a and the wrappings 59a provided for the same purpose in each case.

The nipple 57 is provided with a sleeve 60 of insulating material for separating it from the short metal tube 61 forming a connection between the inner flexible tube 16 and the metal contact member 52 having a passage therethrough communicating with the threaded portion 49 of the inlet valve housing 48 as shown in Figs. 1 and 4. The short metal tube 61 is rigidly connected with the nipple 57 by molding the material of the insulating sleeve 60 between said parts, and in screwing the nipple into position, the outer end of the metal tube 61 will become firmly seated on the end of the terminal receiving contact member 52 as shown in Fig. 4, whereby to form a liquid tight joint between said parts.

The inner end of the fluid holding tube 16 is forced over the annular rib-like portion 62 of the short metal tube 61 and is secured in position by tightly wrapping a thread or fine wire 63 upon the overlapping portion of said fluid holding tube as shown in Fig. 4, thus affording a sealed joint between said parts.

The opposite end of the inner tube 16 is likewise secured upon the reduced portion 17a of the nipple 17, said portion having an annular rib-like member 17b thereon over which the tube 16 is forced, the end of the tube being secured by the wrapping 18a whereby a liquid tight joint is afforded between the tube and the nipple. The joints between the nipple 17 and the tubes 16 and 29 are protected by the thimble 27 on the casing 10 and the guard 28 carried by the thimble.

The joints between the inner ends of the tubes 16 and 29 and the metal parts 61 and 57, with which said ends are respectively connected are protected by a detachable guard 64 screwed on the threaded portion 65 of the insulating coupling 50.

As previously stated, the resistance element 51 may be formed in any desired manner, but preferably comprises a double coil of wire looped at its middle portion as shown at 66 in Fig. 5, the loop being secured upon the tube 16 by wrapping the binding thread 18a about the same. The opposite portions of the wire, extending from the loop, are spirally wound on the outer face of the inner tube 16, the ends of said portions, one indicated at 67 and the other at 68, being respectively connected with the short metal tube 61 and the nipple 57, preferably by means of solder as shown at 69 in Fig. 3. The end portion 67 of the coil is secured by extending it beneath the wrapping 63 on the inner end of the tube 16, and the portion 68 of the coil is secured by extending it between the nipple 57 and the surrounding portion of the outer tube thereon.

With this arrangement the end portion 67 of the coil is connected with the terminal of the circuit wire 55 by means of the short metal tube 61, the terminal receiving member 52 and the terminal or binding post 54 thereon. The opposite end 68 of the wire is connected with the terminal of the circuit wire 55a by means of the nipple 57, the terminal receiving contact member 53, and the binding post or terminal 54a thereon, as shown in Fig. 4.

The circuit wires 55 and 55a are respectively connected with the coils 70 and 71 of the step-down transformer shown in Fig. 1, the transformer being connected preferably with an ordinary lighting circuit, the voltage of which is reduced to afford the desired heating capacity for the coil 51.

It will be understood that while the unitary heating tube or connection shown in Figs. 1 and 2 is particularly adapted for use by dentists for heating or maintaining the fluid remaining within the connection at the desired temperature after closing the control valves therefor, that the tube or connection may be employed by others for the heating of fluids or liquids for whatever purpose desired.

It will also be understood that the fluid or liquid may be heated within the tube to different temperatures by varying the voltage of the current passing through the heating coil by any well known means or in any desired manner.

I claim:

1. A fluid control device comprising a pair of tubular members mounted for longitudinal movement one relative to another and one having a fluid passage leading to the other, a valve carried by one of said members normally closing said passage and having an operating element cooperating with the other of said members to open said valve upon relative movement between said members, said valve including cylindrical and tapered portions, the cylindrical portion upon opening the valve affording a restricted flow of the fluid through said passage and the tapered portion affording a gradual increase in the flow of the fluid therethrough, means connected with the valve carrying member for supplying fluid thereto, and manually operable means for effecting relative movement between said members.

2. A fluid control device comprising a pair of inner and outer tubular members mounted for relative movement, one having a fluid discharge passage communicating with the other and terminating in a fluid inlet opening, a tapered valve normally closing said opening and adapted when progressively opened to afford a gradual increase in the flow of the fluid through the opening, an operating element for the valve extending longitudinally within said passage, an actuating part for said element disposed within the outer tubular member and having one or more fluid discharge ports therein, and means for effecting relative movement between said members to cause said element to move said valve.

3. A fluid control device comprising a pair of inner and outer tubular members mounted for relative movement, one having a fluid discharge passage communicating with the other and terminating in a fluid inlet opening, a valve normally closing said opening including a tapered portion extending within the opening, an operating element for the valve extending longitudinally within said passage, an actuating part for said element adjustable within said outer member to control the position of the valve relative to the inlet opening, and operating means for moving one of the tubular members relative to the other to effect unseating of the valve and during which movement a gradual increase in the flow of the fluid will be afforded by reason of the taper of the valve.

4. A fluid control device comprising an outer tubular member provided with a bore, an inner tubular member having a valve chamber in one end thereof, the opposite end of said member being reduced and sleeved within said bore to afford relative movement between said members one longitudinally of another, a fluid supply conduit connected with said chamber, a valve within the chamber normally closing the inner end of said reduced portion and including an enlongated tapered member extending within said reduced portion, an operating stem for the valve disposed within said reduced portion, an actuating part for the valve stem adjustable within the bore of said outer member, means for moving one of said members longitudinally of the other to effect unseating of the valve, means adjustable longitudinally of one of said tubular members for co-operation with the other to vary the extent of movement of the valve when opening the latter, and means for returning said members to normal position.

5. A fluid control device comprising an outer tubular member provided with a bore, an inner tubular member having a valve chamber in one end thereof, the opposite end of said member being reduced and sleeved within said bore to afford relative movement between said members one longitudinally of another, a fluid supply conduit connected with said chamber, a valve within the chamber normally closing the inner end of said reduced portion and having a tapered extension disposed within said reduced portion, an operating stem for the valve within the reduced portion having one end engaging the tapered extension of the valve, an actuating part for the stem disposed within the bore of the outer member and provided with one or more fluid outlet passages, means for moving one of said members longitudinally of the other to effect unseating of the valve, and resilient means for returning said members to normal position.

6. A syringe comprising communicating inner and outer tubular members mounted for movement one relative to another, a nozzle carried by said outer member in communication therewith, said inner member having a fluid passage for discharging fluid under pressure to the outer member, a valve for closing the inlet end of said passage having a tapered portion extending within the passage and provided with a recess, an operating stem for the valve extending longitudinally within said passage and projecting within said recess, an actuating part for said valve stem adjustable within the outer member to control the position of the valve and provided with a recess within which the valve stem projects, said actuating part having one or more fluid outlet ports therein for discharging fluid to the nozzle, and means movable on one of said members to effect relative movement between the same.

7. A syringe comprising a pair of tubular members mounted for relative movement one longitudinally of another, a nozzle carried by one of said members in communication therewith, the other member having a fluid discharge passage communicating with the nozzle carrying member and terminating in a fluid inlet opening, a valve normally closing said opening and having thereon a tapered portion extending within said passage, an operating element for the valve extending through said passage into the nozzle carrying member, an actuating member for said element adjustable within the nozzle carrying member, and means for effecting relative movement between said members, the tapered portion of said valve when the latter is moved from closed position serving to gradually increase the size of the inlet opening to provide for a corresponding gradual increase in the flow of the fluid therethrough.

8. A syringe comprising a pair of telescoped inner and outer tubes, one movable longitudinally of the other, a nozzle on the outer tube communicating therewith, a valve seated on the inner tube and normally closing the latter, said valve having a stem projecting within the outer tube, an actuating part for the stem threaded within the outer tube and adjustable therein to control the position of the valve relative to its seat, said adjustable actuating part having one or more outlet ports discharging into the outlet tube to supply fluid to the nozzle, a fluid supply conduit communicating with the inner tube, and manually operable means by which to move one of the tubes relative to the other to effect opening of said valve.

ALPHONSE F. PIEPER.